United States Patent [19]
Noguero

[11] Patent Number: 6,161,505
[45] Date of Patent: Dec. 19, 2000

[54] RESTRAINING APPARATUS

[76] Inventor: Elena M. Noguero, 3015 W. Michigan Ave., Phoenix, Ariz. 85053

[21] Appl. No.: 09/247,200

[22] Filed: Feb. 9, 1999

[51] Int. Cl.[7] .................................................. A01K 27/00
[52] U.S. Cl. .......................... 119/792; 119/795; 119/797
[58] Field of Search .................................. 119/794, 792, 119/793, 797, 795, 856, 863; 130/152

[56] References Cited

U.S. PATENT DOCUMENTS

| D. 245,350 | 8/1977 | Geary | D30/152 |
|---|---|---|---|
| 4,060,056 | 11/1977 | Maietta | 119/793 |
| 4,559,906 | 12/1985 | Smith | 119/865 |
| 4,655,172 | 4/1987 | King | 119/792 |
| 4,676,198 | 6/1987 | Murray | 119/771 |
| 5,150,667 | 9/1992 | Salidrigas | 119/863 |
| 5,791,295 | 8/1998 | Schmid et al. | 119/793 |
| 5,794,571 | 8/1998 | Goldberg | 119/792 |
| 5,896,831 | 4/1999 | Alpert | 119/856 |

*Primary Examiner*—Peter M. Poon
*Assistant Examiner*—Yvonne R. Abbott
*Attorney, Agent, or Firm*—Parsons & Goltry; Robert A. Parsons; Michael W. Goltry

[57] ABSTRACT

A flexible tether connecting a collar to a harness with a portion of the tether between the collar and the harness available to be held for restraining an animal wearing the collar and the harness.

13 Claims, 2 Drawing Sheets

RESTRAINING APPARATUS

FIELD OF THE INVENTION

This invention relates generally to the field of restraining apparatus and, more particularly, to apparatus for restraining dogs, cats and other domesticated animals.

BACKGROUND OF THE INVENTION

Dogs are probably the most popular of all domesticated animals. For most owners, the unconditional love and companionship their dogs naturally exude is very rewarding. Because of the close relationships that build between dogs and their owners, keeping their dogs safe from injury is of paramount importance. Dogs are most vulnerable to debilitating or fatal injury when exposed to vehicular traffic when being walked by their owners. Collars and leashes are normally employed by dog owners to restrain their pets from leaping into oncoming traffic. However some dogs are so big or strong that they can overcome their owners when excited and escape. Accordingly, it would be highly desirable to improve upon conventional dog restraining apparatus.

Accordingly, it would be highly desirable to provide improved apparatus for restraining dogs, cats and other domesticated animals.

It is a purpose of the present invention to provide improved restraining apparatus that is easy to use.

It is another purpose of the present invention to provide improved restraining apparatus that is easy to construct.

It is still another purpose of the present invention to provide improved restraining apparatus that is inexpensive.

It is a further purpose of the present invention to provide improved restraining apparatus that is strong.

SUMMARY OF THE INVENTION

The above problems and others are at least partially solved and the above purposes and others are realized in a new and improved restraining apparatus. In a preferred embodiment, the restraining apparatus comprises a flexible tether for attachment to a collar and a harness. The flexible tether interconnects the collar to the harness in a closed condition of the restraining apparatus with portions of the tether between the collar and the harness available to be held for restraining an animal wearing the collar and the harness. The flexible tether defines a free distal end in an open condition of restraining apparatus which is available to be held for restraining an animal wearing one of the collar and the harness.

BRIEF DESCRIPTION OF THE DRAWINGS

The foregoing and further and more specific objects and advantages of the instant invention will become readily apparent to those skilled in the art from the following detailed description thereof taken in conjunction with the drawings in which.

DETAILED DESCRIPTION OF A PREFERRED EMBODIMENT

Figure 1:
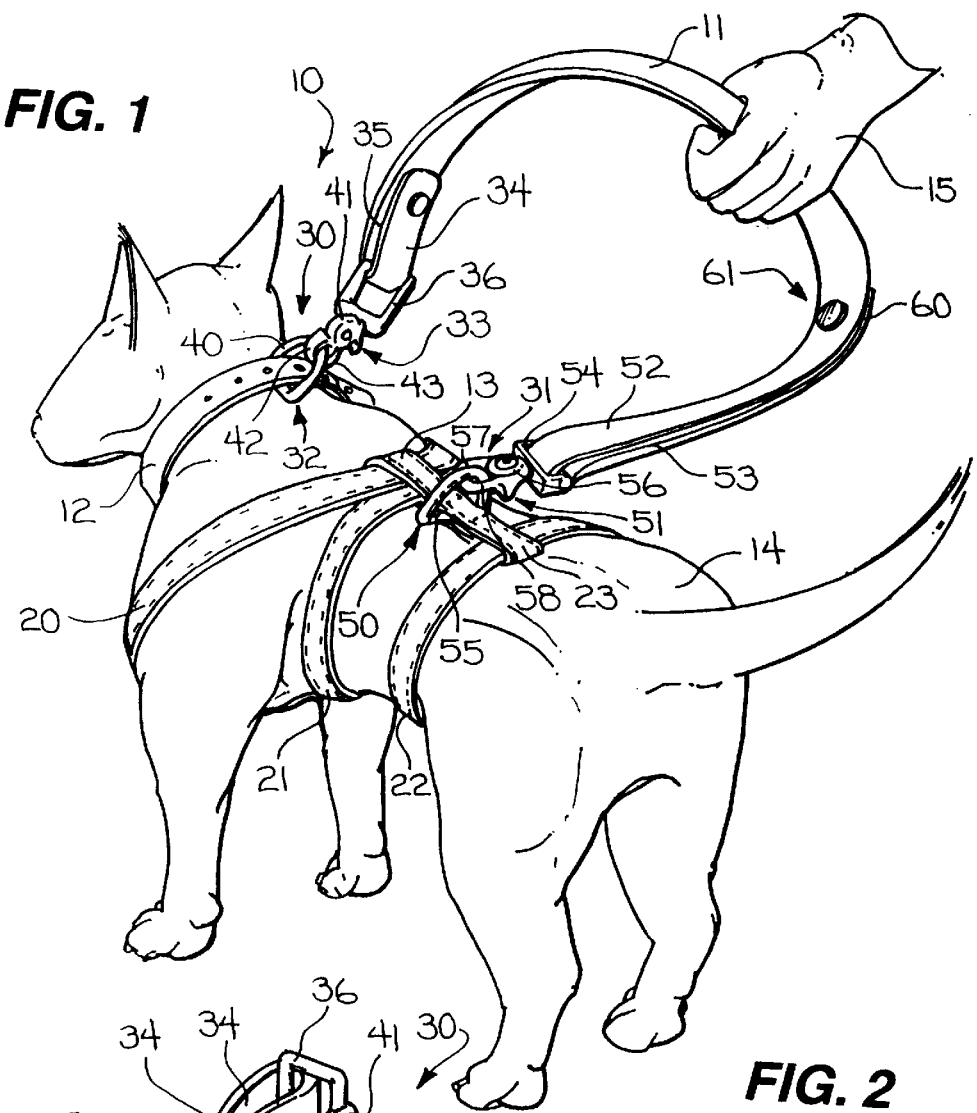
FIG. 1 is a perspective view of restraining apparatus comprising a flexible tether or leash connecting a collar to a harness in a closed condition of restraining apparatus, with a portion of the tether between the collar and the harness shown held by a user for restraining an animal wearing the collar and the harness.

Turning now to the drawings, in which like reference characters indicate corresponding elements throughout the several views, attention is first directed to FIG. 1 which illustrates a perspective view of restraining apparatus 10 comprising a flexible tether or leash 11 connecting a collar 12 to a harness 13 worn by an animal 14 with a portion of tether 11 between collar 12 and harness 13 shown held by a hand 15 of a user for restraining animal 14. Animal 14 is shown here as a dog, although it could be a cat, rabbit or other domesticated animal. Like a conventional animal collar, collar 12 is elongate, constructed of leather, canvas or other flexible material and engagable in a continuous condition around the animal's 14 neck as shown. Although not illustrated, collar 12 may be engaged in a continuous condition with a buckle, a hook and loop fastening structure commonly found under the exemplary trademark VELCRO®, high strength snaps or other suitable fastening means. Like conventional animal harnesses, harness 13 includes a chest strap 20 and abdominal straps 21 and 22 connected together with a bridge strap 23. Harness 13 is preferably constructed of a flexible material such as leather, canvass, etc., and is engagable about the animal's 14 torso as shown. Harness 13 is disclosed in this embodiment as having specific structural features. However, animal harnesses of this general type may be readily found in a variety of different forms and configurations, all of which are intended to be considered equivalents in structure and function to harness 13.

Figure 2:
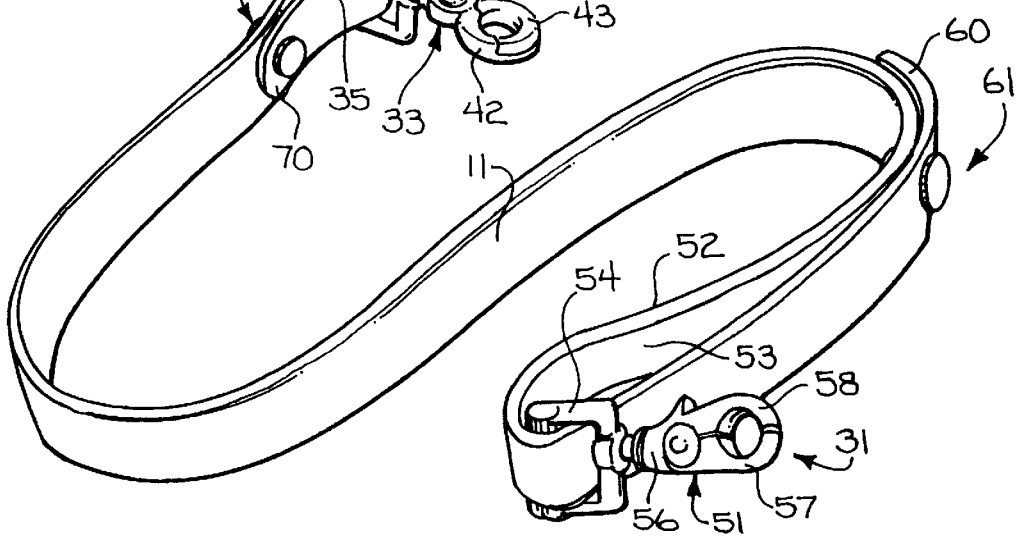
FIG. 2 is a perspective view of the flexible tether of FIG. 1.

Regarding FIGS. 1 and 2, restraining apparatus 10 includes an assembly 30 for holding an end 34 of tether 11 to collar 12 and an assembly 31 for holding an end 52 of tether 11 to harness 13. Assembly 30 includes an engagement element 32 carried by collar 12 and a detachably engagable complemental engagement element 33 carried by tether 11. End 34 of tether 11 supports complemental engagement element 33. In this specific example, end 34 is a loop 35 that engages a ring 36 that supports complemental engagement element 33. Engagement element 32 comprises a ring 40 formed in the shape of a "D," and complemental engagement element 33 comprises a clip 41. Clip 41 includes jaws 42 and 43 coupled for pivotal movement between an open position and a closed position for capturing ring 40 as shown in FIG. 1.

Assembly 31 includes an engagement element 50 carried by harness 13 and a detachably engagable complemental engagement element 51 carried by tether 11. End 52 of tether 11 supports complemental engagement element 51. In this specific example, end 52 is a loop 53 that engages a ring 54 that supports complemental engagement element 51. Engagement element 50 comprises a ring 55 carried by bridge strap 23 and formed in the shape of a "D," and complemental engagement element 51 comprises a clip 56. Clip 56 includes jaws 57 and 58 coupled for pivotal movement between an open position and a closed position for capturing ring 55 as shown in FIG. 1.

Figure 4:
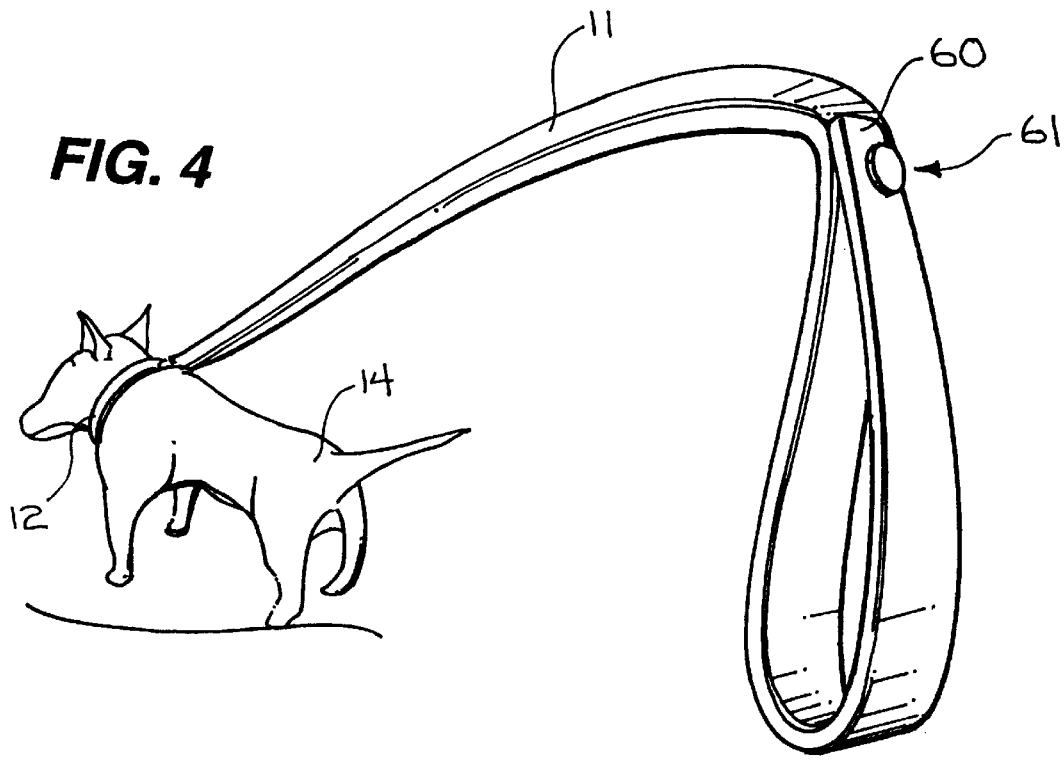
FIG. 4 is a perspective view of restraining apparatus of FIG. 1 including the flexible tether connected to the collar in an embodiment of an open condition of the restraining apparatus, the tether having a free distal end available to be held by a user for restraining an animal wearing the collar.

With tether 11 connecting the collar 12 and harness 13 in what is considered a closed condition of restraining apparatus 10, portions of tether 11 between collar 12 and harness 13 are available to be held for restraining animal 14 when wearing collar 12 and harness 13 as shown in FIG. 1. With collar 12 and harness 13 each coupled to tether 11 in this closed condition of restraining apparatus 10, it provides a user with an exemplary means for controlling animal 14. Because tether 11 is detachably connected to collar 12 and harness 13, a user may, for instance, disengage complemental engagement element 51 from engagement element 50 to detach end 52 of tether 11 from harness 13. This is considered an open condition of restraining apparatus 10. In this open condition, end 52 is considered to be a free distal end available (FIG. 4) to be held for restraining animal 14 when wearing collar 12. If a harness is being employed, a user may disengage complemental engagement element 33 from engagement element 32 to detach end 34 of tether 11 from collar 12 and re-attach it to harness 13. Thus, it should be understood that when restraining apparatus 10 is in the open condition, complemental engagement element 33 can be engaged to either collar 12 or harness 13.

Figure 3:
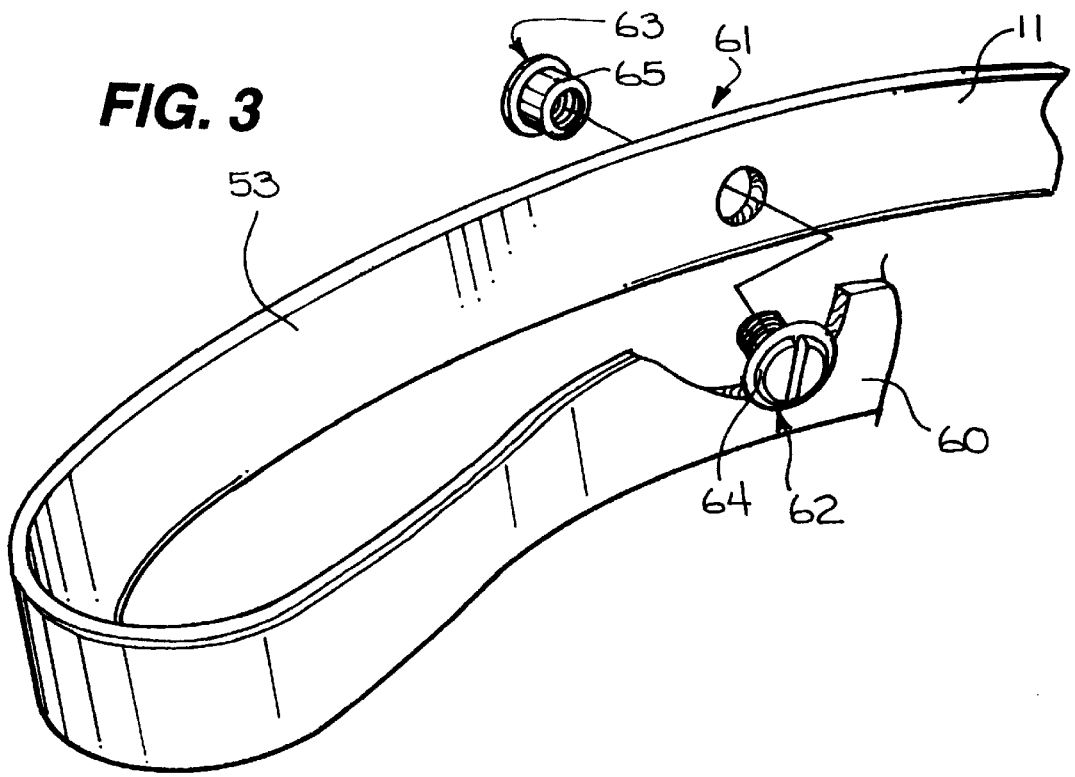
FIG. 3 is a fragmented perspective view of the flexible tether of FIG. 1 showing engagement apparatus engagable for forming a loop in the flexible tether.

Turning to FIG. 3, the loop 53 of tether 11 is formed with a free end 60 folded back and coupled to tether 11 with engagement apparatus 61. Engagement apparatus 61 comprises engagement structure 62 carried by free end 60 and detachably engagable complemental engagement structure 63 carried by tether 11 spaced from free end 60. In this embodiment, engagement structure 62 includes a threaded nut 64 and complemental engagement structure 63 includes a threadably engagable bolt 65. Although not illustrated, engagement apparatus 61 may include a buckle assembly, a hook and loop fastening structure commonly found under the exemplary trademark VELCRO®, high strength snaps or other suitable fastening mechanism. From the open condition of restraining apparatus 10 previously described, engagement structure 62 may be detached from complemental engagement structure 63 and end 52 of tether 11 pulled away from ring 54 thereby removing complemental engagement element 51. So detached from assembly 31, engagement apparatus 61 may be re-engaged to form loop 53 which is, of course, considered to be the free distal end available (FIG. 4) to be held for restraining animal 14 when wearing collar 12, or alternatively, harness 13, or remain open to provide additional length.

Like loop 53, loop 35 of tether 11 is formed with a free end 70 folded back and coupled to tether 11 with preferably a permanent attachment such as rivet 71, adhesive, stitching, etc. It should be understood that the same or similar construction to engagement apparatus 61 may be employed. It should also be understood that engagement apparatus 61 can also be a permanent attachment such as stitching, rivets, etc. if a convertible leash it not desired.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. Restraining apparatus comprising a flexible tether connecting a collar to a harness with a portion of the tether between the collar and the harness available to be held for restraining an animal wearing the collar and the harness, a first assembly including a first engagement element carried by the collar and a detachably engagable first complemental engagement element carried by the tether for holding the tether to the collar, and a second assembly for holding the tether to the harness.

2. Restraining apparatus of claim 1, wherein the first engagement element comprises a first ring and the first complemental engagement element comprises a first clip.

3. Restraining apparatus comprising a flexible tether connecting a collar to a harness with a portion of the tether between the collar and the harness available to be held for restraining an animal wearing the collar and the harness, a first assembly for holding the tether to the collar, and a second assembly for holding the tether to the harness, the second assembly includes a second engagement element carried by the harness and a detachably engagable second complemental engagement element carried by the tether.

4. Restraining apparatus of claim 3, wherein the second engagement element comprises a second ring and the second complemental engagement element comprises a second clip.

5. Restraining apparatus comprising:
    a flexible tether;
    a collar;
    a harness;
    a first assembly including a first engagement element carried by the collar and a detachably engagable first complemental engagement element carried by the tether for holding the tether to the collar; and
    a second assembly for holding the tether to the harness;
    the flexible tether
        connecting the collar to the harness in a closed condition of restraining apparatus with portions of the tether between the collar and the harness available to be held for restraining an animal wearing the collar and the harness, and
        defining a free distal end in an open condition of restraining apparatus which is available to be held for restraining an animal wearing one of the collar and the harness.

6. Restraining apparatus of claim 5, wherein the first engagement element comprises a first ring and the first complemental engagement element comprises a first clip.

7. Restraining apparatus comprising:
    a flexible tether;
    a collar;
    a harness;
    a first assembly for holding the tether to the collar; and
    a second assembly including a second engagement element carried by the harness and a detachably engagable second complemental engagement element carried by the tether for holding the tether to the harness;
    the flexible tether
        connecting the collar to the harness in a closed condition of restraining apparatus with portions of the tether between the collar and the harness available to be held for restraining an animal wearing the collar and the harness, and defining a free distal end in an open
        condition of restraining apparatus which is available to be held for restraining an animal wearing one of the collar and the harness.

8. Restraining apparatus of claim 7, wherein the second engagement element comprises a second ring and the second complemental engagement element comprises a second clip.

9. Restraining apparatus of claim 7, the tether including a first end detachably engaged to the first assembly and a second end engaged to the second engagement assembly.

10. Restraining apparatus of claim 9, wherein the first end defines a first detachable loop.

11. Restraining apparatus comprising:
- a flexible tether having a first end and a second end for connecting a collar to a harness in a closed condition, with a portion of the tether between the collar and the harness available to be held for restraining an animal wearing the collar and the harness, and an open condition wherein one of the first end and the second end are detached from one of the collar and the harness;
- a first engagement element for attaching the first end of the tether to one of the collar and the harness; and
- a second engagement element for attaching the second end of the tether to one of the collar and the harness.

12. Restraining apparatus of claim 11, the tether including the first end detachably engaged to the first engagement element and the second end engaged to the second engagement element.

13. Restraining apparatus of claim 12 further including a loop formed in the first end of the tether for releasably engaging the first engagement element.

* * * * *